Figure 1:
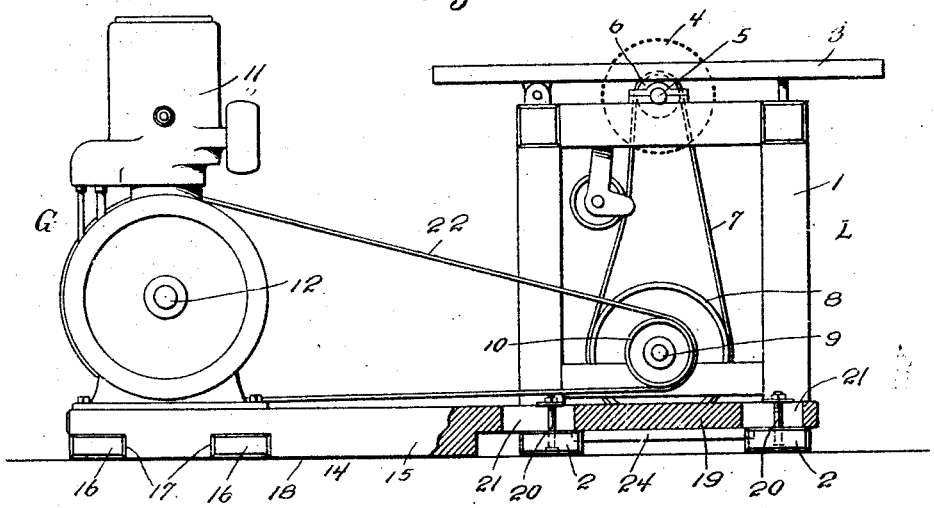

Aug. 18, 1925.

C. W. ANDERSON 1,550,414

ENGINE MOUNTING FOR SAW TABLES

Filed June 24, 1920

Inventor
Charles W. Anderson
By his Attorney

Patented Aug. 18, 1925.

1,550,414

UNITED STATES PATENT OFFICE.

CHARLES W. ANDERSON, OF BROOKLYN, NEW YORK.

ENGINE MOUNTING FOR SAW TABLES.

Application filed June 24, 1920. Serial No. 391,406.

*To all whom it may concern:*

Be it known that I, CHARLES W. ANDERSON, residing at Brooklyn, in the county of Kings and State of New York, have invented certain new and useful Improvements in Engine Mountings for Saw Tables, of which the following is a specification.

This invention relates to an engine mounting for saw tables and other devices.

In building saw tables and other pieces of machinery, which are intended to be driven by a power element so that the power element and said piece of machinery constitute a self-contained unit capable of being moved from place to place, it has been found desirable that the power element, which is usually a heavy and more or less costly and complicated engine or motor, should preferably be capable of independent handling. At the same time it has been found that such engine or motor should preferably be mounted to be adjustable relative to the other mechanism, and this is particularly true where a belt is employed to form the driving connection between the motor and the other mechanism.

Furthermore, particularly in the case of a saw table driven by an upright explosive engine, such an engine, in order to furnish the required amount of power, is of such height that it projects upwardly above the level of the table portion of the saw table, hence that in order to utilize a motor of adequate power such motor must be removed an appreciable distance away from the table so as not to interfere with work being moved about upon the surface of the table.

It is an object of the present invention, therefore, to provide means whereby the motor is removably connected with the saw table or other mechanism by parts rendering the motor easily and conveniently adjustable and at the same time supporting the motor in appropriate position spaced from the other mechanism.

A further object is to so design the entire device that when the motor and its carrying parts are separated from the other mechanism, both said motor and said other mechanism are provided with suitable skids by means of which they may be readily slid along the ground or floor from place to place. Also, to make the skids of the motor so that they may be readily and conveniently moved into proper association with the other mechanism preparatory to being connected together.

Other objects and aims of the invention, more or less specific than those referred to above, will be in part obvious and in part pointed out in the course of the following description of elements, combinations, arrangements of parts and applications of principles, constituting the invention; and the scope of protection contemplated will be indicated in the appended claim.

In the accompanying drawings which are to be taken as a part of this specification, and in which I have shown merely a preferred form of embodiment of the invention:—

Figure 2:
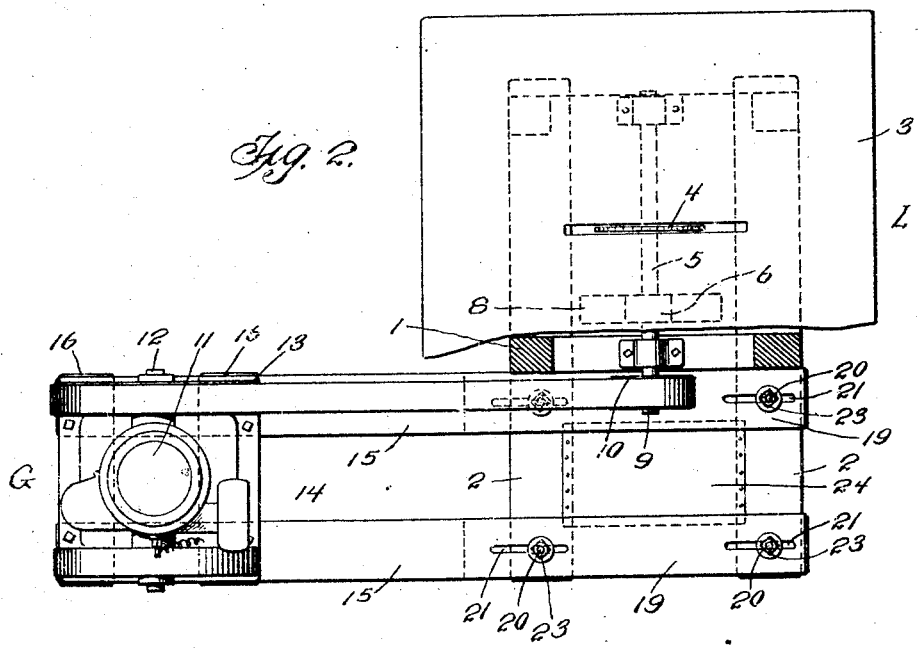

Figure 1 is a side elevational view of a saw table unit constructed in accordance with this invention, parts being shown in vertical section for better illustrating the arrangement of its features, and Figure 2 is a top plan view of the structure seen in Fig. 1.

Referring to the drawings for describing in detail the structure therein illustrated, the reference character L indicates what is conveniently described as the saw table, or work element, while the reference character G indicates what is conveniently referred to as the power element.

It is to be particularly pointed out here that altho the element L is herein shown and described as being a saw table, yet this invention is not to be understood as limited to the use of a saw table for the element L. It will be apparent that other devices, such for instance as planing or turning machines, lathes, fruit presses, printing presses, etc., could be just as readily employed as could a saw table.

The saw table illustrated consists of a frame 1, mounted upon a pair of skids 2, and having the table proper 3 at its upper end. The saw 4 is mounted upon a shaft 5 carrying a pulley 6 over which plays a belt 7 driven by a wheel 8 mounted upon a shaft 9. The shaft 9 carries a pulley 10 which is adapted to be driven for operating the saw.

The power element G may consist of any suitable type of engine or motor appropriately supported. As illustrated it consists of an upright explosive engine 11 having a drive shaft 12 carrying a pulley 13. The engine is mounted upon a skid 14.

The skid 14 is made up of two elongated members, as 15, spaced apart and connected together by a pair of cross members 16. The members 15 have pockets 17 formed in their under sides within which the cross members 16 fit so that the lower surface of said members 15 and 16 are substantially flush to complete an appropriately smooth skid surface 18 for engagement with the ground. The engine 11 is mounted at one end of the members 15 and the cross members 16 are positioned beneath the engine. The opposite ends of the members 15 are reduced in thickness, as at 19, so that they stand above the level of the surface 18 a distance which is substantially equal to the thickness of the skids 2 of the element L. In this way the parts 19 may be readily moved into position over the parts 2, as indicated particularly in Fig. 1, while both the parts 2 and the surface 18 are resting upon the ground.

Suitable bolts, or other fastening means, as 20, are carried by the parts 2 projecting upwardly therefrom for engagement within openings 21 formed thru the members 15.

When the parts have been thus assembled, a belt, or the like, as 22, is placed in position about the pulleys 10 and 13.

It is a particular feature of this invention to make the openings 21 in the form of slots extending longitudinally of the members 15 so that the members 15 may be readily adjusted longitudinally with respect to the members 2. The exact distance of the pulley 13 from the pulley 10 may by this means be readily altered for adjusting the belt 22 to proper tension since adjustment of the members 15 relative to the members 2 will move the entire power element relative to the work element. After the two elements are in proper adjustment, the nuts, or the like, as 23, may be clamped down to hold the parts against subsequent unintentional movement. If the belt stretches or shrinks, the parts may be again adjusted proportionally.

Since each of the members 15 are provided with two of the slotted openings 21 spaced apart in the length of the members 15, substantially as indicated, it is apparent that engagement of the four bolts 20 within the slots 21, while permitting adequate adjustment of the pulleys 10 and 13 in a direction toward and away from each other, at the same time will hold said two pulleys in proper alinement with each other.

When it is desired to transport this device from place to place, the power element may be readily disconnected from the work element and each be handled as a separate entity. When so disconnected the two elements are capable of easy manipulation upon their respective skids. Yet, the skids may be locked together and adjusted relative to each other as above set forth at any time desired.

The engine is suitably spaced from the work element so that any desired size of engine may be employed without interference with the proper functions of the work element.

The two elements thus constructed constitute a complete and efficient unit capable of use in many connections. Its two elements are each independently built, may be easily transported, and may be easily assembled to complete the unit, the required adjustment of the driving connections between the two elements being accomplished during the act of connecting the elements together.

As many changes could be made in this construction, without departing from the scope of the invention, as defined in the following claim, it is intended that all matter contained in the above description, or shown in the accompanying drawings, shall be interpreted as illustrative only and not in a limiting sense.

The projecting portions of the skids 2 may be connected together by a plate 24 if desired to thus make said skids more rigid.

Having thus described my invention, what I claim as new and desire to secure by Letters Patent is:—

In a device of the class described, the combination with a work element having skids upon which it is supported, of a power element also having other skids upon which it is supported, said skids constituting means whereby said elements respectively may be independently moved along a floor from place to place upon occasion, a drive belt connecting said power and work elements, and means connecting said skids together of a character to determine the tension of said drive belt, the skids of one element being shaped at their under sides to provide openings between the floor and relatively overhanging portions of said skids arranged to receive the skids of the other element in lapping relation, and said connecting means being carried by one of said skids and adjustably engaging the lapping portions of the other skids whereby to permit adjustment of the skids relative to each other and to thereby alter the tension of the belt.

In testimony whereof I affix my signature.

CHARLES W. ANDERSON.